United States Patent
Freeman et al.

(10) Patent No.: US 9,959,462 B2
(45) Date of Patent: May 1, 2018

(54) LOCATING AND TRACKING FINGERNAILS IN IMAGES

(71) Applicant: HOLITION LIMITED, London (GB)

(72) Inventors: Russell Freeman, London (GB); Maria Jose Garcia Sopo, London (GB)

(73) Assignee: HOLITION LIMITED, London (GB)

( * ) Notice: Subject to any disclaimer, the term of this patent is extended or adjusted under 35 U.S.C. 154(b) by 0 days. days.

(21) Appl. No.: 15/360,202

(22) Filed: Nov. 23, 2016

(65) Prior Publication Data

US 2017/0154214 A1    Jun. 1, 2017

(30) Foreign Application Priority Data

Nov. 27, 2015    (GB) .................................. 1520968.7

(51) Int. Cl.
| | | |
|---|---|---|
| *G06K 9/00* | (2006.01) | |
| *G06K 9/46* | (2006.01) | |
| *G06K 9/62* | (2006.01) | |

(52) U.S. Cl.
CPC ....... *G06K 9/00375* (2013.01); *G06K 9/4604* (2013.01); *G06K 9/621* (2013.01)

(58) Field of Classification Search
CPC ... G06K 9/00375; G06K 9/4604; G06K 9/621
See application file for complete search history.

(56) References Cited

U.S. PATENT DOCUMENTS

| 4,720,869 A | * | 1/1988 | Wadia | ................ G06K 9/00362 356/71 |
| 8,919,903 B2 | * | 12/2014 | Yamasaki | .............. B41J 3/4073 347/14 |
| 9,239,962 B2 | * | 1/2016 | Hoshino | .............. G06K 9/4652 |
| 9,666,169 B2 | * | 5/2017 | West | ....................... G10D 3/163 |
| 9,857,971 B2 | * | 1/2018 | Chang | ................ G06F 3/04886 |

FOREIGN PATENT DOCUMENTS

| JP | 2009003813 A | 1/2009 |
| WO | 2014/209071 A1 | 12/2014 |

OTHER PUBLICATIONS

Grieve, Thomas R., John M. Hollerbach, and Stephen A. Mascaro. "Force prediction by fingernail imaging using active appearance models." World Haptics Conference (WHC), 2013. IEEE, 2013.*
Grieve, Thomas R., John M. Hollerbach, and Stephen A. Mascaro. "Fingernail image registration using active appearance models." Robotics and Automation (ICRA), 2013 IEEE International Conference on. IEEE, 2013.*
GB Search Report dated Mar. 31, 2016 issued in GB1520968.7.

* cited by examiner

*Primary Examiner* — Shefali Goradia
(74) *Attorney, Agent, or Firm* — Morris & Kamlay LLP

(57) ABSTRACT

A computer-implemented method and system are described for locating fingernails of a person's hand in an image. An approximate location of each fingernail in the image is determined. An approximate location of each of a plurality of digit-shape objects in the image is initialized based on the approximate locations of the fingernails, and initially refined based on respective digit-shape object models and corresponding functions. The approximate location of each fingernail sub-shape is further refined based on a respective fingernail model and its corresponding function.

35 Claims, 10 Drawing Sheets

LOCATING AND TRACKING FINGERNAILS IN IMAGES

FIELD OF THE INVENTION

This invention relates to an image processing system, and more particularly to techniques for locating and tracking fingernails of a person's hand using image data analysis.

BACKGROUND OF THE INVENTION

Feature tracking systems are generally known, in which tracking of an identified person or object in a captured scene is performed based on established image processing techniques. For example, one well known technique for object shape modelling is Active Shape Modelling (ASM), as discussed for example in "Lip Reading Using Shape, Shading And Scale", Mathews, Cootes, Cox, Harvey and Bangham, and "An Introduction To Active Shape Models", Tim Cootes. Another well known technique for object appearance modeling is Active Appearance Modelling (AAM), as discussed for example, in "Active Appearance Models", Cootes, Edwards and Taylor. The applicant's prior applications GB2518589, GB2516739 and GB2517270 discuss particular techniques for modelling and tracking face features in images. However, such known feature tracking systems lack the accuracy and processing efficiency required for real-time tracking and augmentation of fingernails in captured image data.

Techniques for tracking fingers are also generally known, such as WO2005091125 (Eyesight Mobile Technologies) discusses finger detection for input of user commands based on a multi-stage segmentation process to identify a stable set of contiguous pixels representing the finger. However, in practice, the inventors have found that image pixel color segmentation is able to provide a rough estimation of location and pose of fingers in an image, which may be sufficient for gesture-based user input systems, but this technique alone is not adequate for applications that require greater accuracy and robustness, for example to enable a better user experience.

What is desired are improved techniques for more robust and efficient finger nail tracking in captured images.

STATEMENTS OF THE INVENTION

Aspects of the present invention are set out in the accompanying claims.

According to one aspect, the present invention provides a method of locating fingernails of a person's hand in an image, comprising the steps of storing individual representations of each digit of a person's hand, each representation including data defining a respective digit-shape model and a corresponding function that approximates variations to the digit-shape model, and a fingernail sub-shape model comprising a subset of the data defining the respective digit-shape model, and a corresponding function that approximates variations to the fingernail sub-shape model; storing a global representation of the plurality of digits of the person's hand, including data defining a global model defining a non-overlapping arrangement of said digit-shape models, and a corresponding function that approximates variations to the global model; determining an approximate location of each identified fingernail in the image; determining an approximate location of each digit in the image, based on the global representation and the approximate location of each identified fingernail; refining the approximate location of each digit in the image, based on the respective digit-shape model and its corresponding function; and refining the location of each fingernail in the image, based on the respective fingernail sub-shape model and its corresponding function.

The approximate location of each identified fingernail in the image may be estimated using a feature detection function, for example based on pixel color segmentation, Haar wavelets or similar functions, shape models from machine learning, depth analysis, or any other form of edge and/or shape analysis. Each estimated (approximate) position may include a relative translation, pose and scale of each identified fingernail. Each refining step may result in a change to one or more of the translation, orientation and scale of the approximate location of an identified fingernail. Each refining step may result in a change to the fingerprint sub-shape of an individual representation.

The method may further include a tracking phase, comprising the steps of receiving a subsequent image; determining an approximate location of each of a plurality of identified fingernails in the subsequent image based on pixel color segmentation; calculating a translation displacement between previous and current estimated global position of each fingernail; applying the translation displacement to the location of each digit in the previous global object to determine an estimated location of each digit in a current global object; refining the digit-shape object of each identified fingernail, based on the global representation and its corresponding function; and repeating steps e) and f) for each refined digit-shape object. The method may further comprise determining that tracking is lost and in response, repeating step d) for the subsequent image.

The digit-shape model comprises data may represent locations of a plurality of feature points and the fingernail sub-shape model comprises a subset of the feature points of the digit-shape model. A plurality of regions of said image may be defined, each containing the identified fingernail at the respective estimated position. Each region may comprise a masked portion of the image data identified as candidate hand pixels based on pixel color segmentation. A digit-shape object may be generated for each identified fingernail, by initializing a digit-shape object, computing a similarity transformation between the initialized digit-shape object and a corresponding digit-shape model, transforming the corresponding region of image data based on the computed similarity transformation, and updating the initialized digit-shape object based on the transformed region of image data.

The approximate location of each digit in the image may be refined by determining a feature descriptor for each digit-shape object based on the transformed region of image data, and applying the corresponding function to the feature descriptor.

Each individual representation may further include data defining at least one further sub-shape model, each comprising a corresponding subset of the data defining the respective digit-shape object model, and a corresponding function that approximates variations to the respective further sub-shape model. The digit-shape object may be split into two or more sub-shape objects based on corresponding sub-shape models, wherein the location of each sub-shape object in the image is refined based on the respective sub-shape model and its corresponding function.

The corresponding functions may comprise regression coefficient matrices. The corresponding function that approximates variations to the fingernail sub-model may comprise a plurality of cascading regression coefficient matrices. The location of each fingernail sub-shape may be iteratively refined based on the respective fingernail submodel and its corresponding plurality of cascading regression coefficient matrices.

In further aspects, the present invention provides a system comprising means for performing the above methods. In yet other aspects, there is provided a computer program arranged to carry out the above methods when executed by a programmable device.

BRIEF DESCRIPTION OF THE DRAWINGS

There now follows, by way of example only, a detailed description of embodiments of the present invention, with references to the figures identified below.

FIG. 2, which comprises FIG. 2A shows an exemplary representation of a trained model according to a worked example. FIG. 2B shows an exemplary representation of a trained model according to a worked example. FIG. 2C shows an exemplary representation of a trained model according to a worked example.

FIG. 4, which comprises FIG. 4A is a portion of the flow diagram illustrating the main processing steps performed by the tracking module of FIG. 1 according to an embodiment. FIG. 4B is a portion of the flow diagram illustrating the main processing steps performed by the tracking module of FIG. 1 according to an embodiment.

FIG. 6, which comprises FIGS. 6A to 6F, schematically illustrates the image data processing by the fingernail detector according to a worked example.

FIG. 7, which comprises FIGS. 7A to 7C, schematically illustrates the image data processing by the tracking module according to the worked example.

DETAILED DESCRIPTION OF EMBODIMENTS OF THE INVENTION

Figure 1:
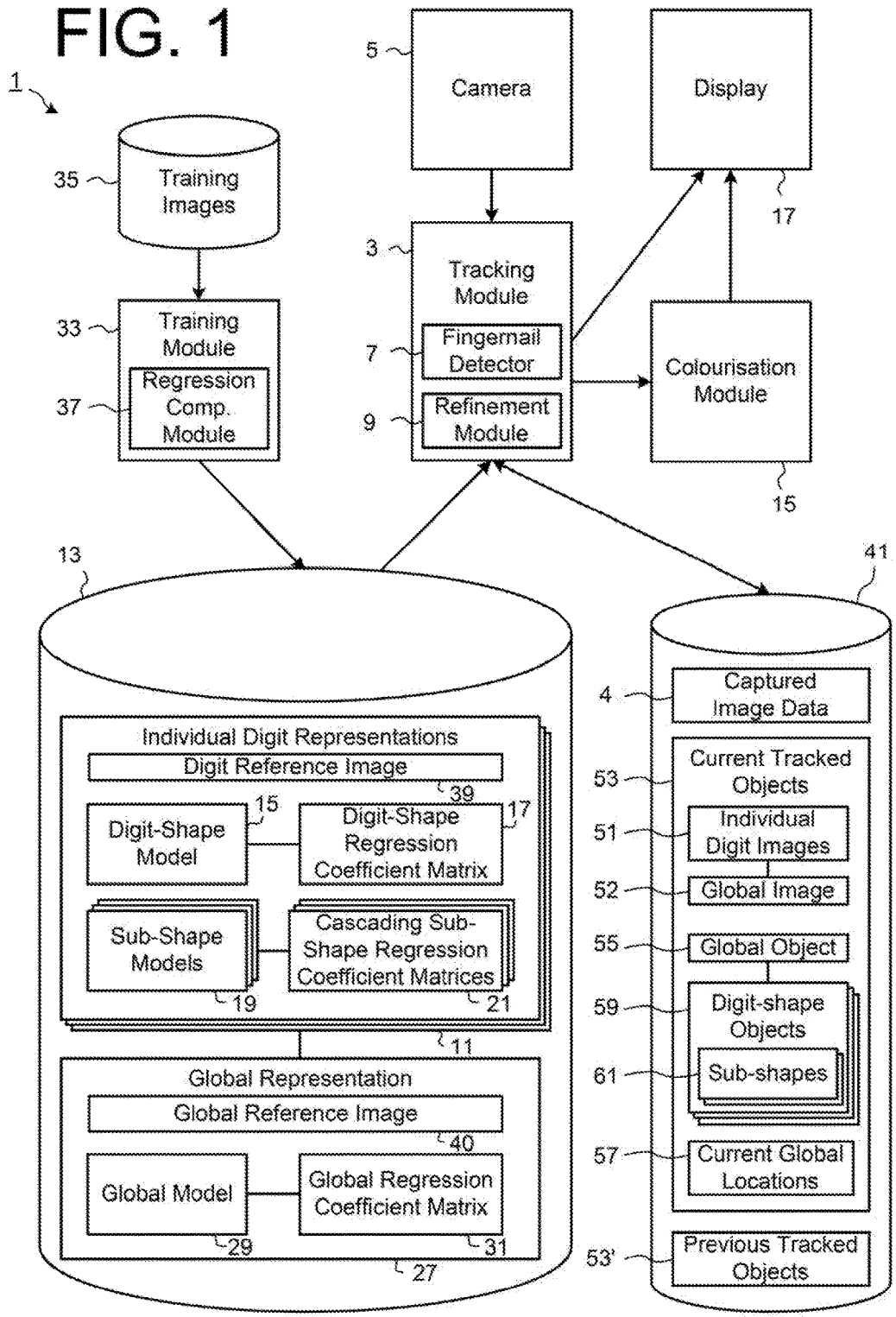
FIG. 1 is a block diagram showing the main components of an augmented reality system according to an embodiment of the invention.

As schematically illustrated in FIG. 1, an augmented reality (AR) system 1 includes a tracking module 3 that receives image data 4 from a camera 5 and processes the received image data 4 to determine and track the location and shape of each fingernail in a captured frame. The camera 5 captures a sequence of frames of a scene containing the person's hand. The user may be prompted to position his or her hand within the camera's field of view such that all five digits of the hand are captured in frames of image data to be processed by the tracking module 3. The nail tracking module 3 includes a fingernail detector 7 that processes the captured image data 4 of each frame, to identify candidate fingernails within a captured frame 4, using an image-based feature detection function, for example based on pixel color segmentation, Haar wavelets or similar functions, shape models from machine learning, depth analysis, or any other form of edge and/or shape analysis. Such image-based feature detection functions are of a type that is known per se, and need not be described further.

The fingernail detector 7 determines a respective initial estimated position for each of a plurality of candidate fingernails. Each estimated position may include a location (translation), orientation (pose) and size (scale) relative to a common reference point. The initial estimated positions are passed to a refinement module 9 of the nail tracking module 3 that determines the shape and location of each fingernail in the image frame, based on data defining individual representations 11 of respective digits of the person's hand stored in a memory 13. A colorization module 15 may then perform image processing to augment regions of the captured image data 4 that correspond to shape and location of the tracked fingernails in each frame in the sequence, for output to a display 17.

Figure 2A:
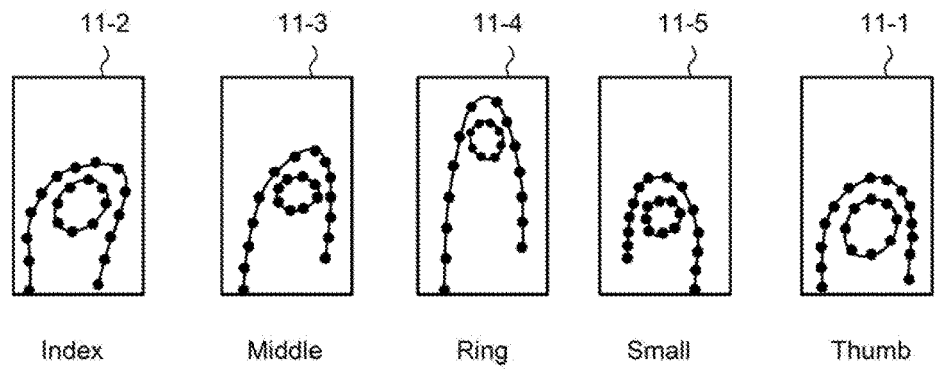
FIGS. 2A to 2C, is a schematic illustration of exemplary representations of trained models according to a worked example.
Figure 2B:
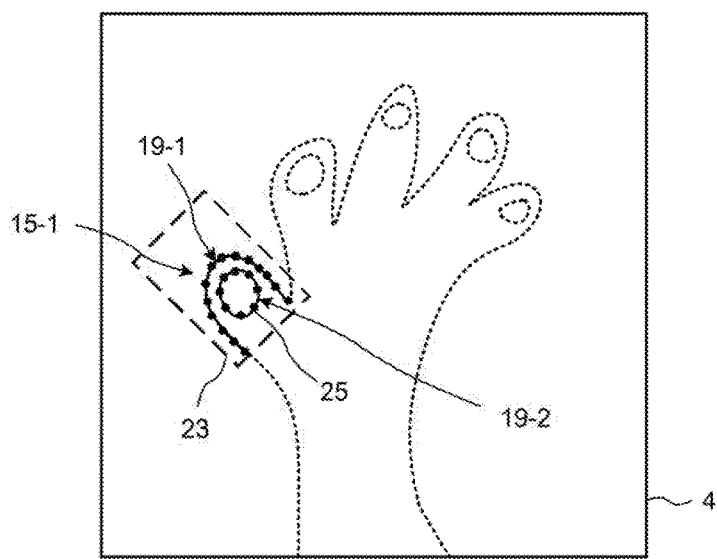

Typically, respective individual digit representations 11 may be provided for an index finger 11-1, middle finger 11-2, ring finger 11-3, small finger 11-4 and thumb 11-5 of a person's hand, as schematically illustrated in FIG. 2A. FIG. 2B schematically illustrates a thumb representation 11-1 overlaid on a sample image of a person's hand. Each individual representation 11 includes data defining a respective digit-shape model 15 and a corresponding function 17 that approximates variations to the digit-shape model 15. Each individual representation 11 also includes data defining a plurality of sub-shape models 19, each comprising a respective subset of the data defining the respective digit-shape model 15, and a corresponding function 21 that approximates variations to the respective sub-shape model 19. In this exemplary embodiment, the sub-shape models 19 each include a finger outline sub-shape 19-1 and a fingernail sub-shape 19-2 of the respective digit-shape 15. Each individual representation 11 may also includes data defining a respective bounding box 23 around feature points 25 of the digit-shape model 15, which is used to extract portions of image data to train and track the digit-shape model 15. The bounding boxes 23 preferably have the same height and width. It will be appreciated that a plurality of individual representations 11 may be defined for digits of the left hand or the right hand, and reflected to match the mirror image of digits of the other hand.

Figure 2C:
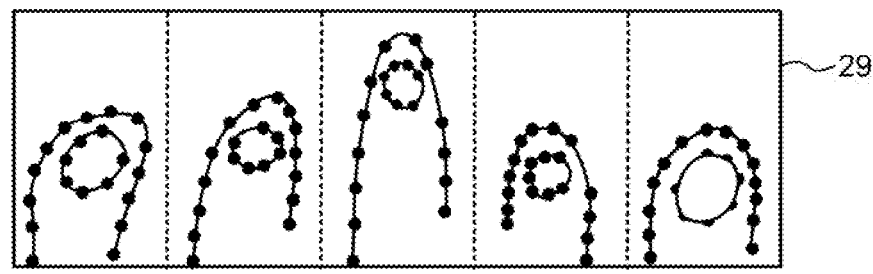

A global representation 27 of all five digits of the person's hand is also stored in the memory 13, the global representation 27 including data defining a global model 29 defining a non-overlapping arrangement of the respective digit-shape model 15 of each digit, and a corresponding function 31 that approximates variations to the global model 25. FIG. 2C schematically illustrates an exemplary global model 29 formed from a linear, non-overlapping arrangement of the five digit-shape models 15 shown in FIG. 2A. As will be described in greater detail below, the refinement module 9 of the tracking module 3 determines an approximate location of each digit in the image, based on the global model 29 and the approximate location of each identified fingernail determined by the fingernail detector 7. The refinement module 9 then refines the approximate location of each digit in the image, based on the respective digit-shape model 15 and its corresponding function 17, and further refines the location of each fingernail in the image, based on the respective fingernail sub-shape model 19 and its corresponding function 21. Advantageously, the global representation 27 is used to minimise or prevent errors and inaccuracies that may otherwise arise from independent drifting of the refined shape and location of each individual digit/fingernail as a result of the subsequent processing of each individual digit representation 11.

Figure 3:
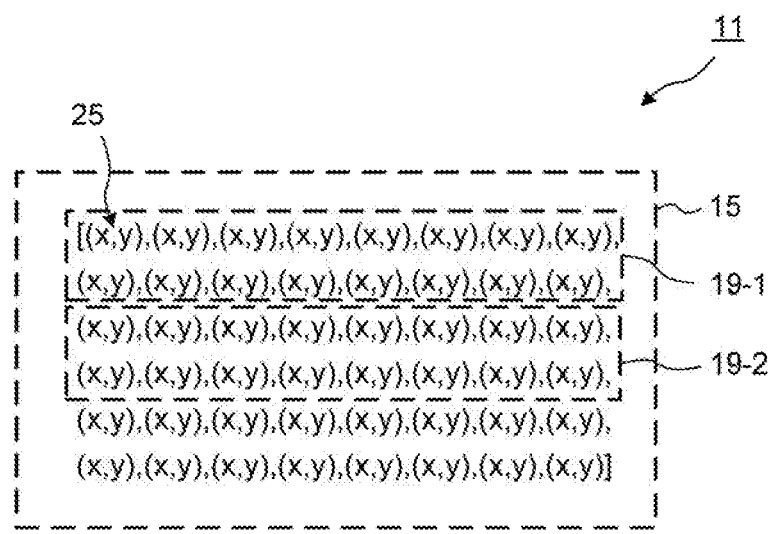
FIG. 3 is a schematic illustration of the data structure of an exemplary trained model including a digit-shape and a plurality of sub-shapes.

The AR system 1 may also include a training module 33 to pre-process training images 35 to generate and store the trained individual digit representations 11 and the associated global representation 27, in advance of real-time processing of input image data from the camera 5 by the tracking module 3. FIG. 3 is a schematic illustration of an exemplary data structure of a trained individual digit representation 11. As shown, the individual thumb representation 11-1 includes data defining a digit-shape 15-1, with an associated fingernail sub-shape 19-1 and a finger outline sub-shape 19-2. The exemplary data structure of the digit-shape model 15 in this simplified example is an array of (x,y) coordinates, each coordinate associated with a respective feature point 25 of the digit-shape 15. Each sub-shape model 19 may be associated with a respective subset of the (x,y) coordinates, each subset thereby defining a plurality of feature points 25 of the respective sub-shape 19. The subsets of feature points 25 for each sub-shape model 19 may overlap. In practice, the estimated shape models 15,19 are described by respective feature point descriptors, such as Fast Retina Keypoint (FREAK), Binary Robust Independent Elementary Features (BRIEF), ORB, HOG or BRISK descriptors, derived from the calculated conversion of input digit- or sub-shape feature points 25 to a selected training image 35.

A regression computation module 37 of the training module 3 may generate the feature descriptors for each digit-shape model 15 based on the training images 35, and compute corresponding offsets between feature points 25 of each digit-shape model 15 and corresponding labelled feature points 25 in the training images 35. The regression computation module 37 may then compute respective regression coefficient matrices 17,21 based on the feature point descriptors and corresponding offsets that are determined from the training images 35. The digit-shape regression coefficient matrix 17 is computed from the feature descriptor and offsets of the digit-shape 15, and each sub-shape regression coefficient matrix 21 is computed from the feature descriptor and offsets of a respective sub-shape 19. The regression coefficient matrices 17,21 define an approximation of a trained function that can be applied to bring the features of a candidate object shape from respective estimated locations to determined "real" positions in an input image. The generation of regression coefficient matrices 17,21 therefore define respective trained functions which relate the texture around an estimated shape and the displacement between their estimated positions and the final position where the shape features are truly located. The regression computation module 35 can be configured to compute the respective regression coefficient matrices 17,21 based on any known regression analysis technique, such as principal component regression (PCR), linear regression, least squares, etc. The functions defined by the trained plurality of regression coefficient matrices 17,21 form parts of the trained individual representations 11 stored in the memory 13. The regression computation module 35 can compute and store a global regression coefficient matrix 31 of the global representation 27 from the global model 29 in a similar way.

As is known in the art (for example as discussed in "Supervised Descent Method and its Applications to Face Alignment", Xiong and De la Torre, 2013 IEEE Conference on Computer Vision and Pattern Recognition (CVPR), June 2013), regression analysis is a statistical process for modelling and analyzing several variables, by estimating the relationship between a dependent variable and one or more independent variables. The regression coefficient matrices 17,21,31 define trained functions that represent a series of directions and re-scaling factors, such that a matrix can be applied to a candidate shape model to produce a sequence of updates to the shape model that converge to an accurately located shape with respect to an input image (e.g. a training image during a training process, or a captured image 4 during a tracking process). In this embodiment, the plurality of sub-shape regression matrices 21 for each sub-shape model 19 are arranged as a cascading data structure. Each regression matrix in level i, overcomes situations where the previous regression coefficient matrix did not lead to the final solution. For example, the first, highest level regression coefficient matrix approximates a linear function that tries to fit all cases in the database. The second and further lower level regression matrices fit situations that the first level regression matrix was not able to cope with. This cascading data structure thereby provides a more flexible function with improved generalization across variations in digit and fingernail shapes. The training process to determine the cascading sub-shape regression coefficient matrices 21 simulates similar captured image scenarios which might be captured and processed during the tracking procedure, utilizing stored training data 5 defining the real or actual displacement or offset between the estimated and real position of the digit- and sub-shape feature points that are known for the training images 35. The texture around an estimated shape is described by the feature descriptors and the offset between corresponding labelled feature points 25 can be measured in pixels coordinates in the reference image resolution.

The training module 33 may also determine a reference image 39 for each digit representation by calculating and scaling a mean shape of the digit-shape model 15, based on a pre-defined value specified by the user, for example 200 pixels as inter-ocular distance. This procedure determines the size of the image where all the computations will be performed during training and tracking. A conversion between shape model coordinates frame in unit space to the image plane in pixel coordinates is performed. As is known in the art, the regression computation module 37 may compute a similarity transformation between the reference image 39 and a plurality of random shape initializations 53. The regression coefficient module 43 performs image processing on training image(s) to transform the image data based on the reference image 39 and the computed similarity transformation. The similarity transformation between the current estimate and the reference image may be computed through an iterative process aiming to minimize the distance between both shapes, by way of geometric transformations, such as rotation and scaling, to transform (or warp) the selected training image 35. In the first iteration, just scaling has a role since the first estimation is a scaled mean shape therefore, the rotation matrix will always be an identity matrix. In further iterations, once the initial scaled mean shape has been modified by the refinement process, scale and rotation will be of great importance. Subsequent regression coefficient matrices 17,21,31 will operate on transformed images which will be very closely aligned with the reference image 39. The training module 33 can compute and store a global reference image 40 of the global representation 27 from the global model 29 in a similar way.

The AR system 1 may be implemented by any suitable computing device of a type that is known per se, such as a desktop computer, laptop computer, a tablet computer, a smartphone such as an iOS™, Blackberry™ or Android™ based smartphone, a 'feature' phone, a personal digital assistant (PDA), or any processor-powered device with suitable user input, camera 9 and display means 15. Additionally or alternatively, the display 15 can include an external computing device, such as a mobile phone, tablet PC, laptop, etc. in communication with a host device for example via a data network (not shown), for example a terrestrial cellular network such as a 2G, 3G or 4G network, a private or public wireless network such as a WiFi™-based network and/or a mobile satellite network or the Internet.

Figure 4A:
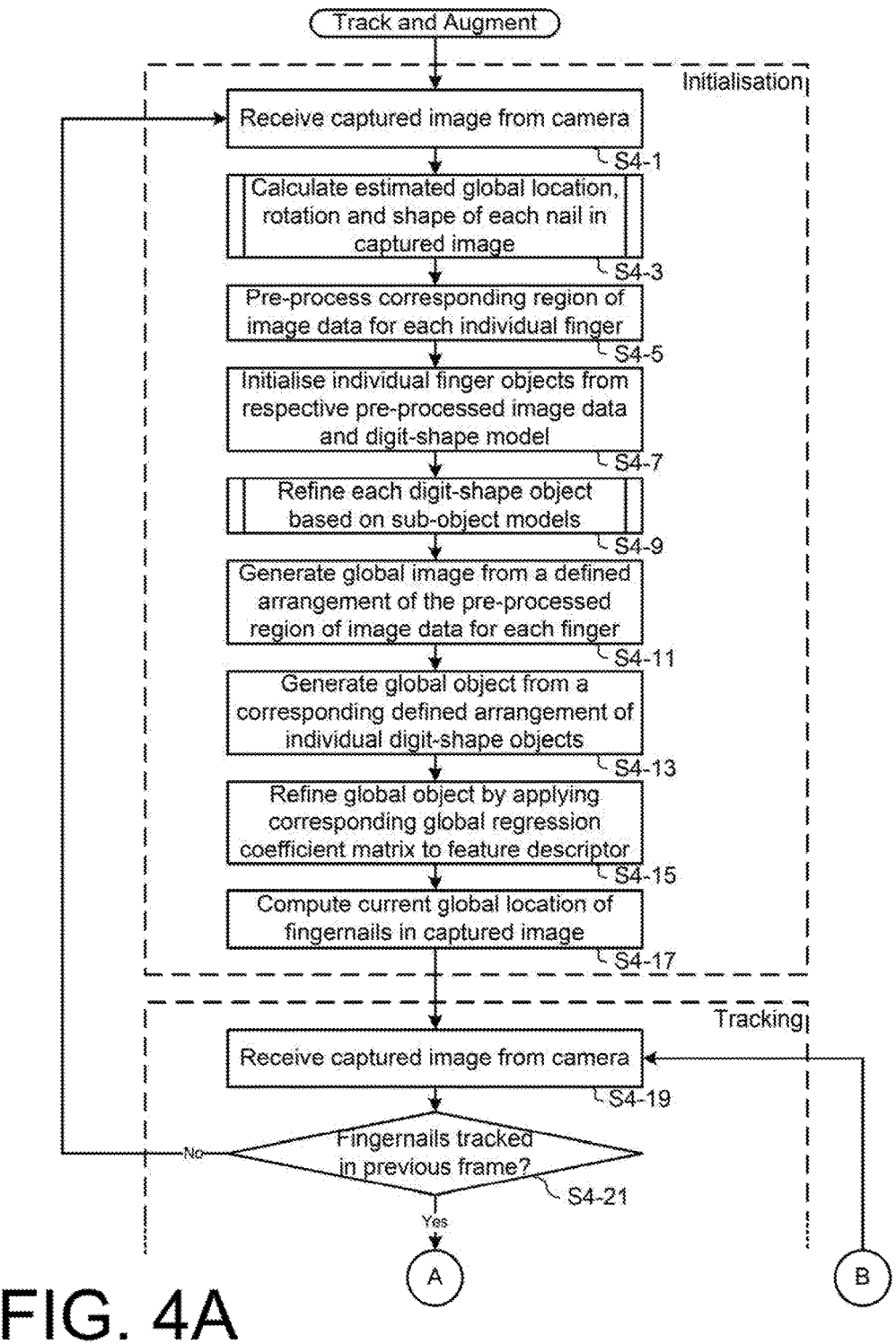
FIGS. 4A and 4B, is a flow diagram illustrating the main processing steps performed by the tracking module of FIG. 1 according to an embodiment.

The initialization and tracking processes performed by the tracking module 3 of the AR system 1 will now be described in more detail with reference to the flow diagrams of FIGS. 4 and 5. Reference is also made to FIGS. 6 and 7, schematically illustrating a worked example of the initialization and tracking phases.

Figure 4B:
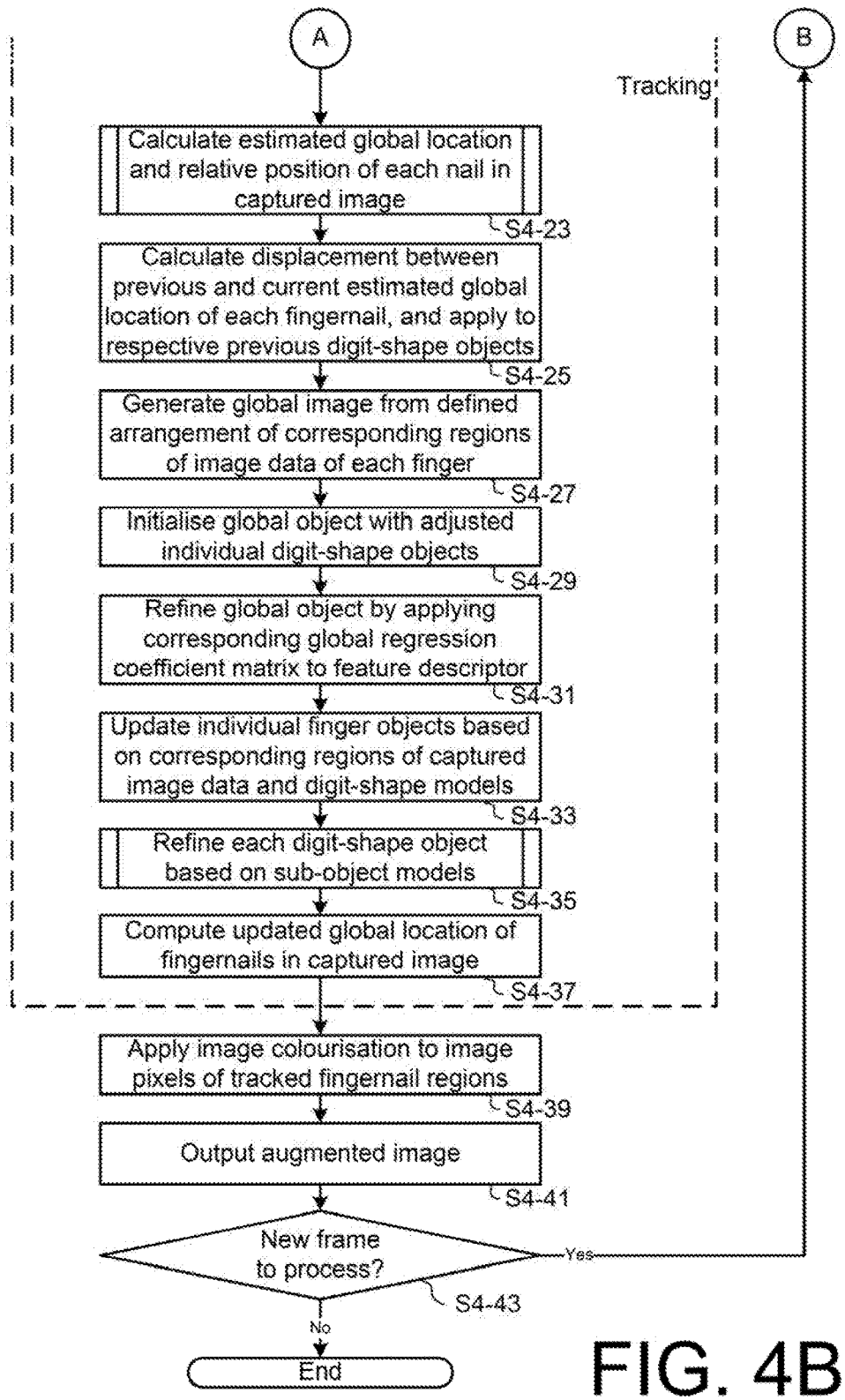

As shown in FIG. 4, an initialization phase begins at step S4-1, where the tracking module 3 receives image data 4 of an initial captured image from the camera 5 and stores the captured image data 4 in the working memory 41. The camera 5 may capture a video frame of the user's hand, and the system 1 may output the captured image data 4 to the display 17 in real-time. An overlay may be shown on the display 17, such as an outline or silhouette of a hand, prompting the user to align the image of their hand with the overlay. At step S4-3, the fingernail detector 7 of the tracking module 3 calculates an estimated position of each identified fingernail in the captured image 4. As will be described in more detail with reference to FIG. 5, the exemplary fingernail detector 7 in this embodiment performs image processing on the captured image data 4 to determine and return a location (translation), orientation (pose) and size (scale) for each fingernail, relative to a common reference point such as an origin of the captured image data 4.

Figure 5:
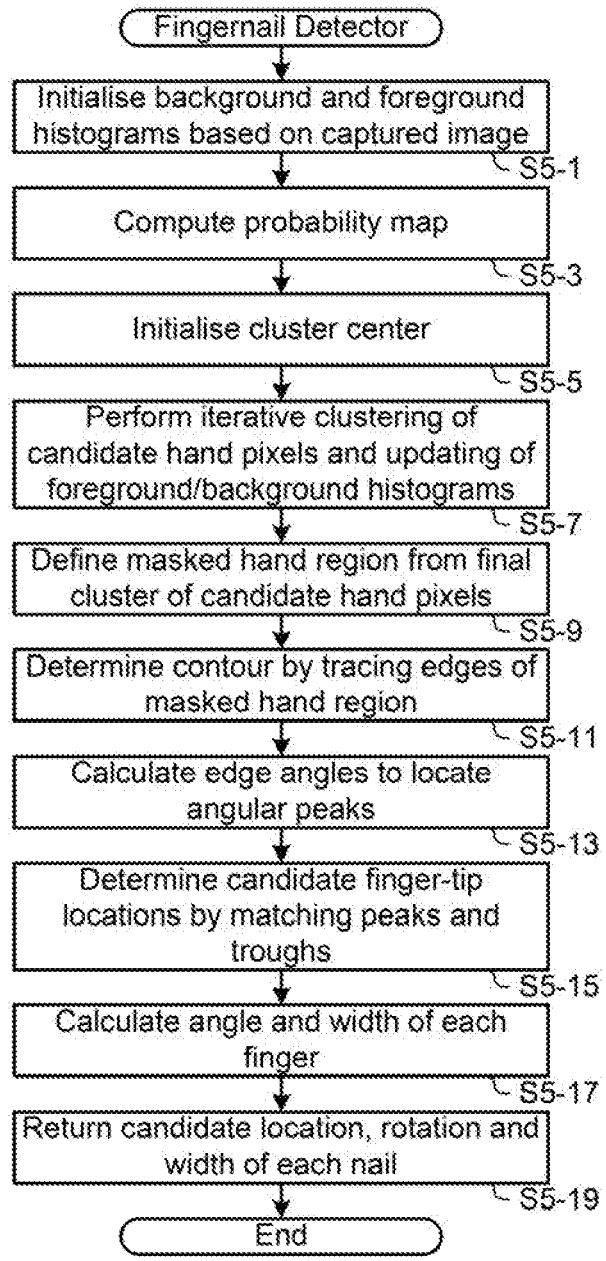
FIG. 5 is a flow diagram illustrating the processing steps performed by an exemplary fingernail detector of FIG. 1 according to an embodiment.

Referring to FIG. 5, at step S5-1, a process of building foreground and background histograms is performed by the fingernail detector 7. Foreground refers to the target area to be detected for example skin/hand regions and background refers to the area to be excluded from the foreground for instance non-skin regions. In an exemplary process, the foreground and background histograms are populated with a frequency of color values occurring in different regions of the image. These regions may be iteratively refined, for example, by creating and updating a mask of captured image data 4 identified as foreground skin/hand pixels, based on exclusive histogram updates of the hand area (e.g. skin) and background areas (e.g. non-skin). By exclusive it is meant that updates in the foreground histograms by foreground masks increases the frequency of the corresponding color but updates the background histogram as well, by decreasing the frequency of that same color. In other words, if the color belongs to the foreground it can not belong to the background. Therefore, the update of any color coming from background or foreground produces effects in both histograms. The background histogram is updated with the frequency of occurrence of each color value outside of the hand area. Similarly, the foreground histogram is updated with the frequency of occurrence of each color value within the hand area. One or more histogram updates may be carried out using the same source image and the same mask. The foreground/background histogram building process may use as an input a converted version of the image data received from the camera 5, for example converted from the camera image data color space (e.g. RGB/RGBA, depending on the camera 5) to a working color space (e.g. YCrCb). It is appreciated that the YCrCb color space is useful, since the histogramming can be carried out in two dimensions by ignoring luminance (Y) and utilizing only the color difference values Cr and Cb.

Additional processing steps may be performed in the histogram building procedure to improve the quality of the generated histograms. For example, at step S5-3, a probability map may be computed from the background histogram, foreground histogram, and the received image data, which for instance uses a Bayesian framework (or similar statistic technique) to determine the probability of a particular pixel belonging to the hand (foreground) by means of the foreground and background histograms. The probability map computation can be calculated using Bayesian inference to obtain the posterior probability according to Bayes' rule, demonstrated below:

$$P(A \mid B) = \frac{P(B \mid A)P(A)}{P(B)} \propto P(B \mid A)P(A)$$

The probability of a pixel with color (Cb,Cr) of belonging to the foreground (i.e. hand/skin) can be computed as follows:

$$P(Cb, Cr) = \frac{P(\text{skin} \mid Cb, Cr)}{P(\text{skin} \mid Cb, Cr) + P(\text{nonskin} \mid Cb, Cr)}$$

where $$P(\text{skin}|Cb, Cr) = P(Cb,Cr|\text{skin}) \cdot P(\text{skin})$$

$$P(\text{nonskin}|Cb, Cr) = P(Cb, Cr|\text{nonskin}) \cdot P(\text{nonskin})$$

The conditional probabilities are calculated by means of the statistics stored in the histogram building procedure employed as follows:

$$P(Cb, Cr \mid \text{skin}) = \frac{\text{foregroundHistogram }(Cb, Cr)}{\text{numSkinPixels}}$$

$$P(Cb, Cr \mid \text{nonskin}) = \frac{\text{backgroundHistogram }(Cb, Cr)}{\text{numNonSkinPixels}}$$

$$P(\text{skin}) = \frac{\text{numSkinPixels}}{\text{numNonSkinPixels}}$$

$$P(nonskin) = \frac{numNonSkinPixels}{numTotalPixels}$$

Once the probability map of being skin has been computed around the hand area, the result may be used in order to reinforce the histogram quality through a clustering process which will produce a finer segmentation of the hand area. Accordingly, at step S5-5, cluster centers for background and foreground may be initialized in the color space. The background cluster center is computed with color values corresponding to pixels within the probability map (and thus constrained to the non-hand area) which have an associated probability of less than a predetermined threshold value—for example a value of 0.5 in the case of a probability range of 0 to 1. The foreground cluster center is calculated with color values corresponding to pixels within the probability map (and thus constrained to the hand area) which have an associated probability higher than the predetermined threshold value. The cluster center for each of these is determined as the center of gravity of all of the points belonging to foreground or background.

Figure 6A:
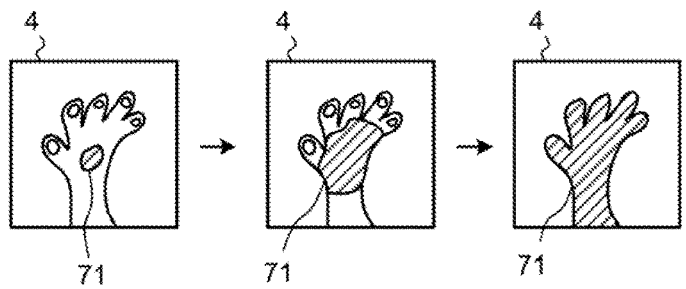
FIG. 6A shows a schematic example of a clustering procedure.

A schematic example of the clustering procedure is shown in FIG. 6A, showing an initial foreground (skin/hand) cluster 71 at the center of the received image, the cluster 71 growing with each successive iteration of the clustering procedure. At step S5-7, a fuzzy c-means clustering algorithm may be used to associate the color values in the CbCr space observed in the hand area with the closest cluster center. This can be carried out by determining the degree of membership of each color value to the foreground cluster center. This would effectively shift certain color values from belonging to one cluster to belonging to the other cluster. The fuzzy c-means clustering may be carried out by minimizing the following objective function:

$$J_m = \sum_{i=1}^{N} \sum_{j=1}^{C} u_{ij}^m \|x_i - c_j\|^2,$$

where $1 \leq m \leq \infty$ and $u_{ij}$ is the degree of membership of $x_i$ (CbCr value) in the cluster j.

$$u_{ij} = \frac{1}{\sum_{k=1}^{C} \left(\frac{\|x_i - c_j\|}{\|x_i - c_k\|}\right)^{\frac{2}{m-1}}},$$

where m (fuzziness)=2

$$c_j = \frac{\sum_{i=1}^{N} u_{ij}^m \cdot x_i}{\sum_{i=1}^{N} u_{ij}^m}$$

After the computation of a clustering stage, an exclusive histogram update may be processed to reinforce the content of the histograms based on the output of each clustering stage. For example, the background histogram may be populated with the frequency of occurrence of color values in the background (non-hand areas)—i.e. associated with the background cluster, while the foreground histogram is populated with the frequency of occurrence of color values in the foreground (hand areas)—i.e. associated with the foreground cluster. The histogram building and clustering process may be repeated until a predefined number of initialization frames have been processed. It is appreciated that while the histogram does not need updating every frame during the tracking process, it is desirable to update the histogram periodically, for example to account for lighting changes. The reinforcement of the histograms can takes place after the initialization and during the tracking procedure in order to overcome situations in which the user experiences changes in the scene such as lighting which affects directly to color features. The final cluster of foreground pixels is defined at step S5-9 as a masked hand region consisting candidate hand pixels of the captured image 4.

Figure 6B:
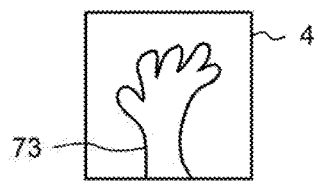
FIG. 6B shows an example of the contour of the masked hand region from FIG. 6A.
Figure 6C:
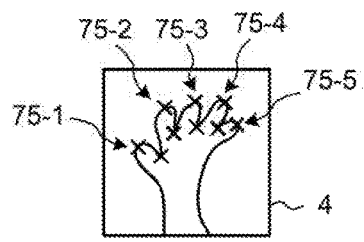
FIG. 6C shows an example of the identified angular peaks along the contour of FIG. 6B.
Figure 6D:
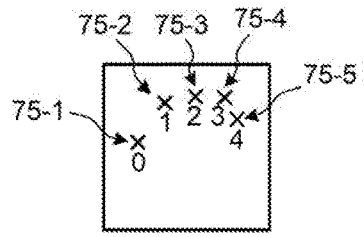
FIG. 6D shows an example of identified candidate finger-tip locations corresponding to the identified peaks in FIG. 6C.

At step S5-11, the fingernail detector 7 performs image processing to determine a contour (outline) 73 of the identified hand by tracing the edges of the masked hand region. FIG. 6B shows an example of the contour of the masked hand region from FIG. 6A. At step S5-13, the fingernail detector 7 processes the contour to calculate edge angles between adjacent sections of the contour and to identify a sequence of angular peaks and troughs along the contour, that is points along the contour where the edge angles are greater than or less than respective predefined threshold values. FIG. 6C shows an example of the identified angular peaks along the contour of FIG. 6B. At step S5-15, the identified sequence of angular peaks and troughs are matched against a predetermined pattern of peaks and troughs, to determine the identified peaks that correspond to candidate finger-tip locations 75-1 to 75-5. FIG. 6D shows an example of the identified candidate finger-tip locations 75 corresponding to the identified peaks in FIG. 6C, with the tip of the thumb labelled 0, index finger labelled 1, middle finger labelled 2, ring finger labelled 3, and small finger labelled 4.

Figure 6E:
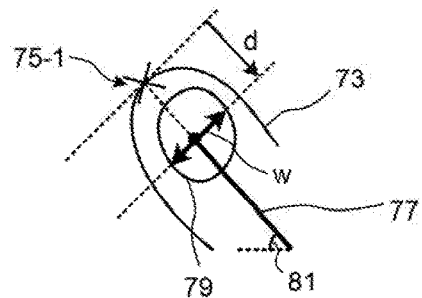
FIG. 6E shows a center line of a digit calculated as the normal to the curve through an identified finger-tip location as shown in FIG. 6D.
Figure 6F:
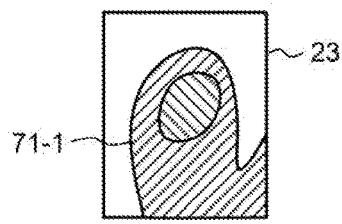
FIG. 6F schematically illustrates an example of masked image data for the identified digit shown in FIG. 6E.

At step S5-17, the fingernail detector 7 calculates a width 79 of the digit associated with each candidate finger-tip, from the contour 73 of the masked hand region 71. For example, as shown in FIG. 6E, the center line 77 of each digit (the thumb in the illustrated example) may be calculated as the normal to the curve through each identified finger-tip location 75. The width (size/scale) 79 of each digit may be calculated from a line perpendicular to the normal at a predefined distance d from the finger-tip 75-1. The orientation (pose) 81 may be computed from the normal 77, relative to the common axes of the received image 4. At step S5-19, the fingernail detector 7 determines and returns a region of masked individual digit image data 51 for each identified finger in the captured image 4, based on the masked hand region 71 defined at step S5-9, and a bounding box 23 at a location relative to the image origin, with dimensions determined from the width and orientation calculated at step S5-17. The individual digit image data 51 may be stored in the working memory 41, for example as part of object data 53 for the current tracked fingernails. FIG. 6F schematically illustrates an example of the masked image data 71-1 for the identified thumb, output by the fingernail detector 7, the masked image data 71-1 within the bounding box 23 at a respective translation, rotation and scale relative to a common reference point.

It will be appreciated that as an alternative, the fingernail detector 7 may instead store a corresponding region of the original, unmasked, captured image data as individual digit image data 51 for each identified finger. Using masked individual digit image data 51 advantageously provides for even greater computational efficiency for the subsequent processing performed by the tracking module 3. However, under certain operating conditions, such as environments with low light and/or cluttered backgrounds, it may be preferable to use original, unmasked, individual digit image data 51 to allow for a degree of error correction by the tracking module 3 when processing the output of the fingernail detector 7. It will also be appreciated that although the present worked example is described in the context of a captured image including all five digits, the present embodiment can be used to process a captured image that only includes a subset of the digits of the user's hand, for example where part of the hand is outside the camera's field of view or otherwise occluded.

Returning to FIG. 4A, at step S4-5, the tracking module 3 may pre-process the individual digit image data 51 of each individual finger returned by the fingernail detector 7, for example to improve the alignment of each finger within the corresponding bounding box 23, relative to the scale and rotation of the finger in the respective reference image 39. Any adjustments made at this stage are stored for example in working memory 41, for use in recovering the original computed positions. At step S4-7, the tracking module 3 initializes a plurality of individual digit-shape objects 59 from the respective individual digit image data 51 pre-processed at step S4-5 and the respective digit-shape models 15 retrieved from the memory 13. Initialization of each digit-shape object 59 may involve warping a trained individual average digit-shape model to the corresponding digit-shape reference image 39 to compute a similarity transformation therebetween, transforming the corresponding individual digit image 51 based on the computed similarity transformation, and deriving each digit-shape object 59 based on a conversion of the average digit-shape model to the transformed individual digit image 51.

Figure 7A:
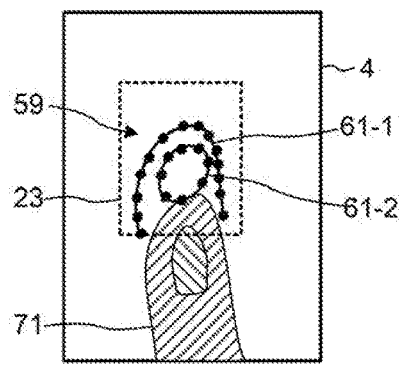
FIG. 7A schematically illustrates a digit-shape object generated for the worked example.

FIG. 7A schematically illustrates a digit-shape object 59 generated for the present worked example, overlaid on the masked region 71 of the finger from the captured image data 4. It will be appreciated that the candidate digit-shape at this stage is an initial approximation of the whole shape of the finger within the corresponding bounding box 23, based on the digit-shape model 15. Accordingly, the location and shape of individual features of the object, such as the finger outline 61-1 and the fingernail 61-2 are not accurate. At step S4-9, the tracking module 3 performs processing to refine the initialized locations of each digit-shape object 59 and respective sub-shape objects 61 based on the digit-shape and sub-shape models 15,19, as will be described with reference to the flow diagram of FIG. 8.

Figure 8:
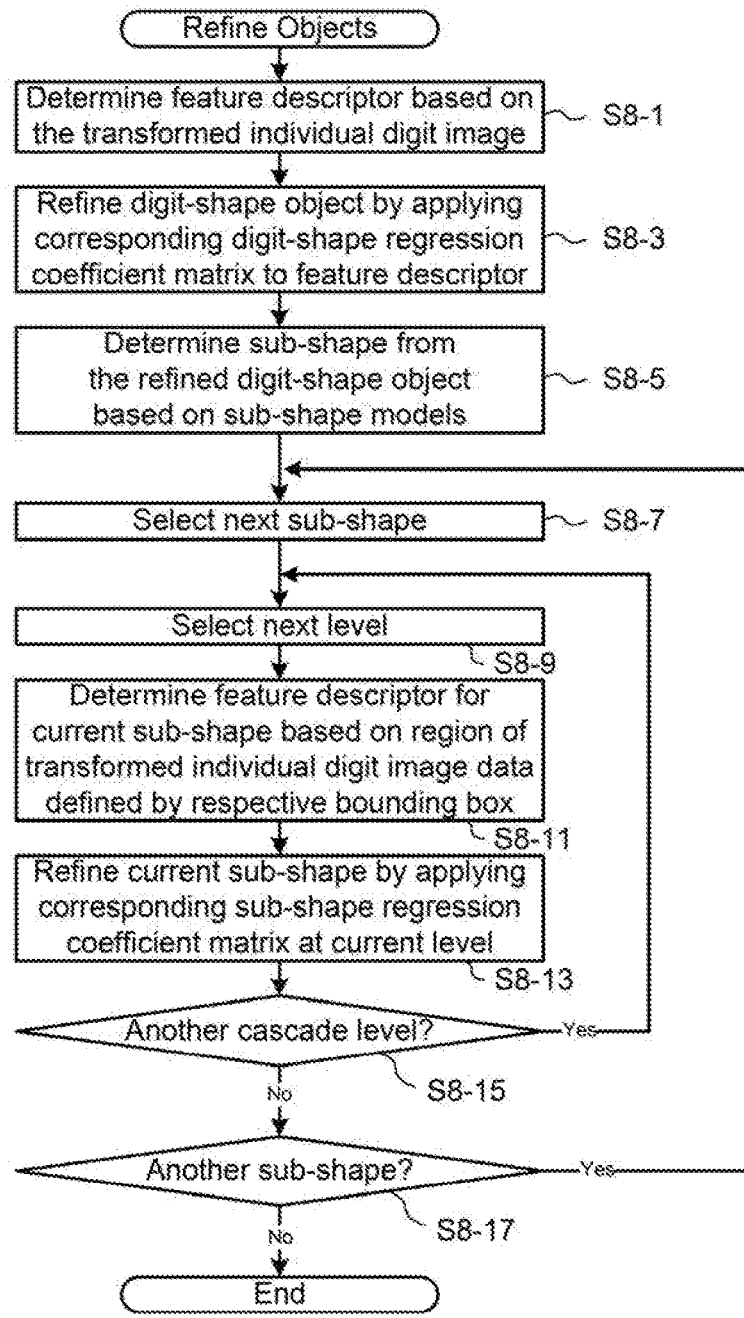
FIG. 8 is a flow diagram illustrating the main processing steps performed by the refinement module to refine the locations according to an embodiment of the invention.

As shown in FIG. 8, the refinement process for each initialized digit-shape object 59 starts at step S8-1 where the refinement module 9 determines a feature descriptor from the corresponding transformed individual digit image 51 for that digit-shape object, based on the feature points 25 defined by the corresponding digit-shape model 15. At step S8-3, the refinement module 9 refines the initialized digit-shape object 59 by applying the corresponding digit-shape regression coefficient matrix 17 to the feature descriptor determined at step S8-1 for that digit-shape object 59. FIG. 7E schematically illustrates an exemplary result of this first refinement step for the digit-shape object 59 overlaid on the corresponding digit image data. At step S8-5, the refinement module 9 determines a plurality of sub-shapes 61 from the current refined digit-shape object 59, based on the sub-shape models 19 as discussed above. FIG. 7F schematically illustrates the outer finger sub-shape 61-1 and the fingernail sub-shape 61-2 of the present worked example. Each sub-shape 61 is then updated by iteratively applying the corresponding cascading sub-shape regression coefficient matrix 21 to the sub-shape 61, starting with the highest, most generalised cascade level.

Accordingly, at step S8-7, the refinement module 9 selects a first cascade level and at step S8-9, selects a first of the sub-shapes 61. The refinement module 9 then determines at step S8-11 a feature descriptor for the sub-shape 61 at the current cascade level, based on the retrieved region of the corresponding transformed individual digit image data 4, the region defined by the corresponding bounding box 23 of the associated digit-object 59. At step S8-13, the refinement module 9 performs processing to refine the current sub-shape 61 by applying the corresponding sub-shape regression coefficient matrix 21 to the feature descriptor for the current sub-shape 61, at the current cascade level. At step S8-15, the refinement module 9 determines if there is another cascade level to process and returns to step S8-9 to select the next cascade level to be processed for the current sub-shape 61. Once the current sub-shape 61 has been processed at each cascade level, the refinement module 9 determines at step S8-15 if there is another sub-shapes 61 to process, and processing returns to step S8-7 where the sub-shape refinement process is repeated for the next sub-shapes 61. When it is determined at step S8-17 that all of the sub-shapes 61 of the current digit-shape object 59 have been processed for all of the cascade levels of the sub-shape regression coefficient matrices 21, the tracking module 3 may determine if the refinement process is to be repeated for a digit-shape object 61 of another finger in the captured image.

Figure 7B:
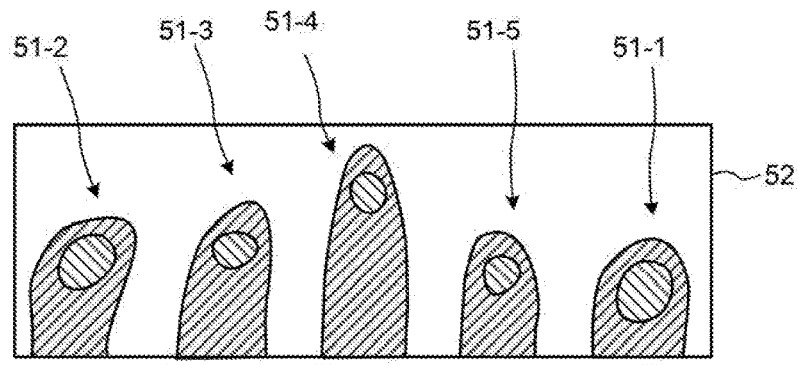
FIG. 7B schematically illustrates a global image generated for the worked example.
Figure 7C:
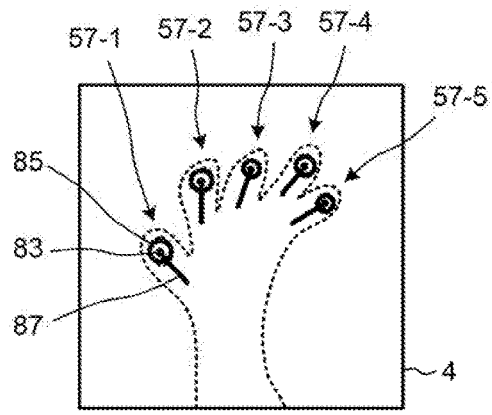
FIG. 7C schematically illustrates a global position including coordinates of a common reference point for the worked example.

At step S4-11, the tracking module 3 generates a global image 52 of the current tracked fingernail objects 53 by combining the pre-processed regions of image data 51 of each individual finger (or the regions of masked image data 51 as received from the fingernail detector 7) in a non-overlapping arrangement as defined by the stored global model 29. FIG. 7B schematically illustrates the global image 52 generated for the present worked example. At step S4-13, the refinement module 9 initializes a global object 55 from a corresponding non-overlapping arrangement of the refined digit-shape objects 59 output from step S4-9. Initialization of the global object 55 may involve combining, into a single data structure, the retrieved digit-shape object 59 for each individual finger in the same non-overlapping arrangement as defined by the stored global model 29.

At step S4-15, the refinement module 9 performs processing to refine the feature points of the global object 55 by applying the regression function defined by the global regression coefficient matrix 31 to a feature descriptor derived from the global object 55. The refinement module 9 may also determine, from the resulting refined global object 55, a variation or error value of the estimated position of each nail output by the fingernail detector 7 at step S4-3. The refinement step by the refinement module 9 may involve determining a feature descriptor from the updated global object 55 and performing regression on the global object 55 to update the feature descriptor based on the corresponding global regression coefficient matrix 31. It is appreciated that, similar to the processing performed by the regression coefficient module 43 of the training module 33, the similarity transformation between the current estimate and the reference image may be computed through an iterative process aiming to minimize the distance between both shapes, by way of geometric transformations, such as rotation and scaling, to transform (or warp) the global image 52 to match the respective global reference image 40. It is also appreciated that the updating step will depend on the particular regression analysis technique implemented by the system 1 to apply the trained function defined by the global regression coefficient matrix 31 to the global object feature descriptor data values.

After the object refinement process is completed for all digit-shape objects, processing proceeds to step S4-17 in FIG. 4, where the tracking module 3 computes the current global position 57 of each fingernail in the working memory 41, based on the refined fingernail object 55 output by the refinement module 9 at step S4-15, to complete the initialization phase. As illustrated in the schematic example of FIG. 7C, each global position 57 may comprise the coordinates of a common reference point 83 of the respective fingernail, such as the notional center of the fingernail, a width of the fingernail represented by the radius of a circle 85 centered at the reference point 83, and a vector 87 representing the center line 77 (and orientation 81) of the fingernail, relative to the origin of the coordinate system of the captured image.

At step S4-19, the tracking module 3 receives captured image data for a subsequent image from the camera 5, to begin the tracking phase using the initialized tracking module 3. At step S4-21, the tracking module 3 determines if one or more predefined objects, a subject's fingernails in this exemplary embodiment, were previously detected and located for tracking in a prior image or video frame. As this will be the first time the tracking phase is executed following the initialization phase described above, the tracking module 3 may determine that data 53' identifying previous tracked objects is stored in the working memory 41, the previous tracked objects data 53' including the tracked location 57 and shape 61 of the subject's fingernails. On the other hand, processing may return to step S4-1 of the initialization phase when it is determined that fingernails were not tracked in a previous image frame.

At step S4-23, the fingernail detector 7 of the tracking module 3 calculates an estimated position of each identified fingernail in the subsequent captured image 4 received at step S4-19, as discussed above at step S4-3 of the initialization phase. Optionally, the tracking module 3 may calculate, at step S4-25, respective displacements between the previous estimated global position of each fingernail, for example as calculated by the fingernail detector 7 for the previous captured image at step S4-3, and the corresponding current estimated global position of each fingernail calculated at step S4-23. The calculated displacements may then be applied by the tracking module 3 at step S4-27 to the previously tracked object data 53, for example to determine a rough approximation of the new position of each digit-shape object 59 and associated sub-shapes 61 in the subsequent captured frame.

The tracking module 3 then proceeds to generate a global image 52 of the current tracked fingernails 53 in the current captured frame, similar to the processing described above with reference to step S4-11, by combining the individual digit image data 51 of each individual finger as received from the fingernail detector 7 at step S4-23, in the non-overlapping arrangement defined by the stored global model 29. At step S4-29, the refinement module 9 initializes a new current global object 55 from the global image 52 generated at step S4-27 from the adjusted individual digit-shape objects 59 output from step S4-25. At step S4-31, the refinement module 9 performs processing to refine the initialized locations of the current global object 55 by applying the regression function defined by the global regression coefficient matrix 31 to a new feature descriptor derived from the current global object 55.

At step S4-33, the tracking module 3 initializes a plurality of new current digit-shape objects 59, for example based on corresponding digit-shape objects stored as previously tracked fingernail objects 53' in the working memory. The plurality of new current digit-shape objects 59 are updated based on corresponding individual digit image data 51 derived from the current image, and the respective digit-shape models 15 retrieved from the memory 13. At step S4-35, the tracking module 3 performs processing to refine the updated locations of each current digit-shape object 59 and respective current sub-shape objects 61 based on the digit-shape and sub-shape models 15,19, as described above with reference to the flow diagram of FIG. 8. After the object refinement process is completed for all current digit-shape objects, processing proceeds to step S4-37, where the tracking module 3 computes an updated global position 57 for each fingernail, based on the corresponding refined fingernail object 55 output by the refinement module 9 at step S4-35, to complete the tracking phase for the current captured image.

At step S4-39, the colorization module 15 determines and applying image colorization to the image pixels of regions of the captured image identified by the tracked fingernail sub-shapes 61-2 and corresponding global positions 57. For example, the colorization module 15 may alter the pixel color and/or alpha values based on stored texture data, predefined colorization equations, or the like. The resulting augmented image with the applied texture and colorization is output at step S4-41, for example on display 15. At step S4-43, the tracking module 3 determines that there is a new captured image frame to process, and processing returns to step S4-19 to continue tracking of the subject's fingernails from the previous frame. Optionally, the tracking module 3 may determine whether tracking of the digit-shape object 59 and/or fingernail sub-object 61 was lost, for example by determining if refinement of the detected fingernail sub-shape 61 is within predefined acceptable parameters, and to restart the initialization phase based on a new captured image 4 received from the camera 5.

Computer Systems

Figure 9:
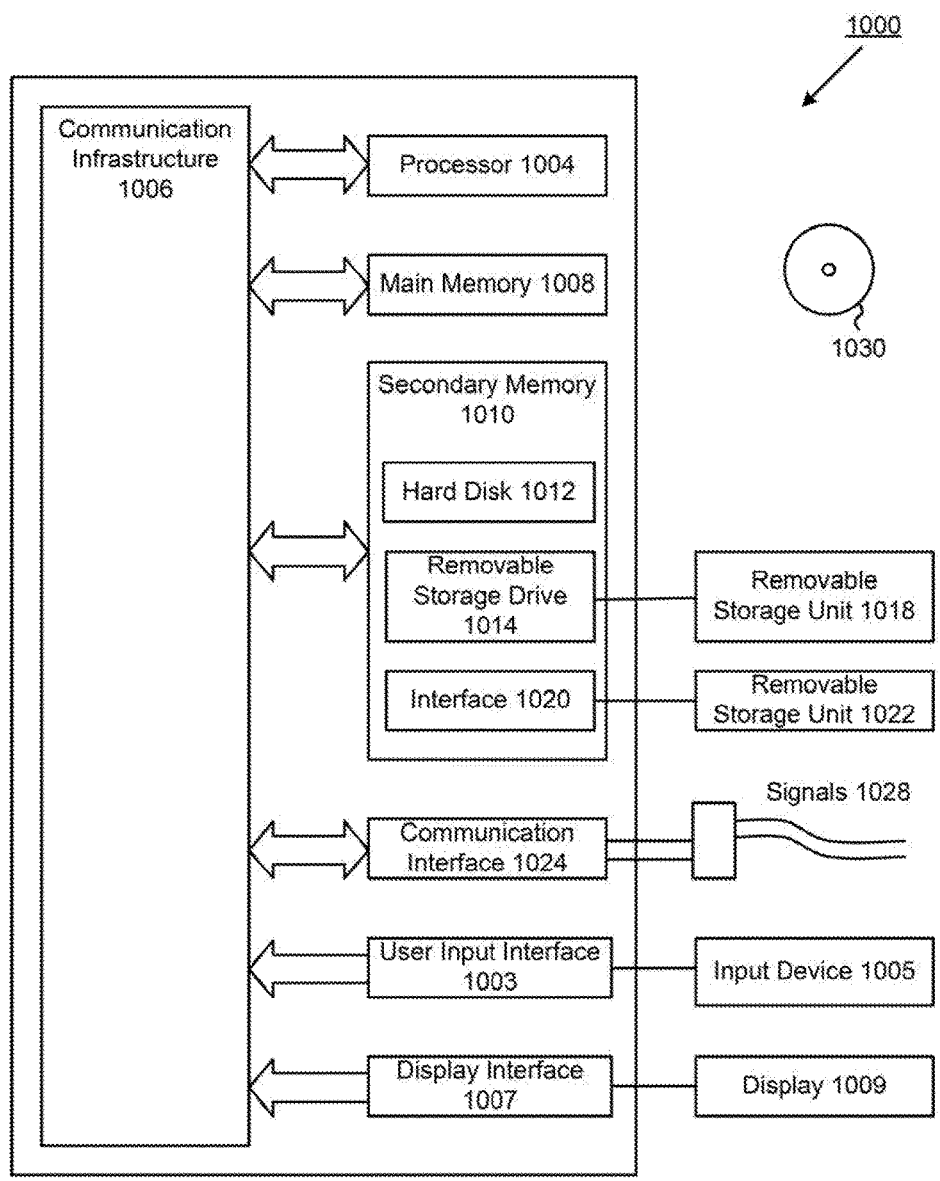
FIG. 9 is a diagram of an example of a computer system on which one or more of the functions of the embodiment may be implemented.

The modules described herein, such as the fingernail detector and tracking modules, may be implemented by one or more computer systems, such as computer system 1000 as shown in FIG. 9. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fiber optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

It will be understood that embodiments of the present invention are described herein by way of example only, and that various changes and modifications may be made without departing from the scope of the invention. In particular, it will be appreciated that aspects of the above discussed embodiments can be combined to form further embodiments. Yet further alternative embodiments may be envisaged, which nevertheless fall within the scope of the following claims.

The invention claimed is:

1. A method of locating fingernails of a person's hand in an image, comprising the steps of:
   a) storing respective individual representations of at least a plurality of each digit of a person's hand, each individual representation including data defining:
      a respective digit-shape model and a corresponding function that approximates variations to the digit-shape model; and
      a fingernail sub-shape model comprising a subset of the data defining the respective digit-shape model, and a corresponding function that approximates variations to the fingernail sub-shape model;
   b) storing a global representation of the plurality of digits of the person's hand, including data defining a global model defining a non-overlapping arrangement of said digit-shape models, and a corresponding function that approximates variations to the global model;
   c) determining an approximate position of each identified fingernail in the image;
   d) determining an approximate position of each digit in the image, based on the global representation and the approximate position of each identified fingernail;
   e) refining the approximate position of each digit in the image, based on the respective digit-shape model and its corresponding function; and
   f) refining the position of each fingernail in the image, based on the respective fingernail sub-shape model and its corresponding function.

2. The method of claim 1, wherein each position includes a relative translation, pose and scale of each identified fingernail.

3. The method of claim 2, wherein each refining step results in a change to one or more of the translation, orientation and scale of the approximate location of an identified fingernail.

4. The method of claim 2, wherein each refining step results in a change to the fingerprint sub-shape of an individual representation.

5. The method of claim 1, wherein the approximate position of each identified fingernail in the image is determined using an image-based feature detection function.

6. The method of claim 1, further comprising:
   receiving a subsequent image;

determining an approximate location of each of a plurality of identified fingernails in the subsequent image based on pixel colour segmentation;

calculating a translation displacement between previous and current approximate global position of each fingernail;

applying the translation displacement to the location of each digit in the previous global object to determine an approximate location of each digit in a current global object;

refining the digit-shape object of each identified fingernail, based on the global representation and its corresponding function; and repeating steps e) and f) for each refined digit-shape object.

7. The method of claim 5, further comprising determining that tracking is lost and in response, repeating step d) for the subsequent image.

8. The method of claim 1, wherein the digit-shape model comprises data representing locations of a plurality of feature points and the fingernail sub-shape model comprises a subset of the feature points of the digit-shape model.

9. The method of claim 1, further comprising defining a plurality of regions of said image each containing the identified fingernail at the respective approximate position.

10. The method of claim 9, wherein each region comprises a masked portion of the image data identified as candidate hand pixels based on pixel colour segmentation.

11. The method of claim 10, further comprising generating a digit-shape object for each identified fingernail, by initializing a digit-shape object, computing a similarity transformation between the initialized digit-shape object and a corresponding digit-shape model, transforming the corresponding region of image data based on the computed similarity transformation, and updating the initialized digit-shape object based on the transformed region of image data.

12. The method of claim 11, wherein refining the approximate location of each digit in the image comprises determining a feature descriptor for each digit-shape object based on the transformed region of image data, and applying the corresponding function to the feature descriptor.

13. The method of claim 1, wherein each individual representation further includes data defining at least one further sub-shape model, each comprising a corresponding subset of the data defining the respective digit-shape object model, and a corresponding function that approximates variations to the respective further sub-shape model.

14. The method of claim 13, further comprising splitting the digit-shape object into two or more sub-shape objects based on corresponding sub-shape models, wherein the location of each sub-shape object in the image is refined based on the respective sub-shape model and its corresponding function.

15. The method of claim 1, wherein the corresponding functions comprise regression coefficient matrices.

16. The method of claim 15, wherein the corresponding function that approximates variations to the fingernail sub-model comprises a plurality of cascading regression coefficient matrices.

17. The method of claim 16, further comprising iteratively refining the location of each fingernail sub-shape based on the respective fingernail sub-model and its corresponding plurality of cascading regression coefficient matrices.

18. A system configured to locate fingernails of a person's hand in an image, comprising: a memory storing: respective individual representations of at least a plurality of each digit of a person's hand, each individual representation including data defining: a respective digit-shape model and a corresponding function that approximates variations to the digit-shape model; and a fingernail sub-shape model comprising a subset of the data defining the respective digit-shape model, and a corresponding function that approximates variations to the fingernail sub-shape model; and a global representation of the plurality of digits of the person's hand, including data defining a global model defining a non-overlapping arrangement of said digit-shape models, and a corresponding function that approximates variations to the global model; and one or more computer processors configured to: determine an approximate position of each identified fingernail in the image; determine an approximate position of each digit in the image, based on the global representation and the approximate position of each identified fingernail; refine the approximate position of each digit in the image, based on the respective digit-shape model and its corresponding function; and refine the position of each fingernail in the image, based on the respective fingernail sub-shape model and its corresponding function.

19. The system of claim 18, wherein each position includes a relative translation, pose and scale of each identified fingernail.

20. The system of claim 19, wherein each refining step results in a change to one or more of the translation, orientation and scale of the approximate location of an identified fingernail.

21. The system of claim 19, wherein each refining step results in a change to the fingerprint sub-shape of an individual representation.

22. The system of claim 18, wherein the approximate position of each identified fingernail in the image is determined using an image-based feature detection function.

23. The system of claim 18, further comprising: receiving a subsequent image; determining an approximate location of each of a plurality of identified fingernails in the subsequent image based on pixel colour segmentation; calculating a translation displacement between previous and current approximate global position of each fingernail; applying the translation displacement to the location of each digit in the previous global object to determine an approximate location of each digit in a current global object; refining the digit-shape object of each identified fingernail, based on the global representation and its corresponding function; and repeating steps e) and f) for each refined digit-shape object.

24. The system of claim 22, further comprising determining that tracking is lost and in response, repeating step d) for the subsequent image.

25. The system of claim 18, wherein the digit-shape model comprises data representing locations of a plurality of feature points and the fingernail sub-shape model comprises a subset of the feature points of the digit-shape model.

26. The system of claim 18, further comprising defining a plurality of regions of said image each containing the identified fingernail at the respective approximate position.

27. The system of claim 26, wherein each region comprises a masked portion of the image data identified as candidate hand pixels based on pixel colour segmentation.

28. The system of claim 27, further comprising generating a digit-shape object for each identified fingernail, by initializing a digit-shape object, computing a similarity transformation between the initialized digit-shape object and a corresponding digit-shape model, transforming the corresponding region of image data based on the computed similarity transformation, and updating the initialized digit-shape object based on the transformed region of image data.

29. The system of claim 28, wherein refining the approximate location of each digit in the image comprises determining a feature descriptor for each digit-shape object based on the transformed region of image data, and applying the corresponding function to the feature descriptor.

30. The system of claim 18, wherein each individual representation further includes data defining at least one further sub-shape model, each comprising a corresponding subset of the data defining the respective digit-shape object model, and a corresponding function that approximates variations to the respective further sub-shape model.

31. The system of claim 30, further comprising splitting the digit-shape object into two or more sub-shape objects based on corresponding sub-shape models, wherein the location of each sub-shape object in the image is refined based on the respective sub-shape model and its corresponding function.

32. The system of claim 18, wherein the corresponding functions comprise regression coefficient matrices.

33. The system of claim 32, wherein the corresponding function that approximates variations to the fingernail sub-model comprises a plurality of cascading regression coefficient matrices.

34. The system of claim 33, further comprising iteratively refining the location of each fingernail sub-shape based on the respective fingernail sub-model and its corresponding plurality of cascading regression coefficient matrices.

35. A non-transitory computer-readable medium comprising computer-executable instructions, that when executed perform the method of: a) storing respective individual representations of at least a plurality of each digit of a person's hand, each individual representation including data defining: a respective digit-shape model and a corresponding function that approximates variations to the digit-shape model; and a fingernail sub-shape model comprising a subset of the data defining the respective digit-shape model, and a corresponding function that approximates variations to the fingernail sub-shape model; b) storing a global representation of the plurality of digits of the person's hand, including data defining a global model defining a non-overlapping arrangement of said digit-shape models, and a corresponding function that approximates variations to the global model; c) determining an approximate position of each identified fingernail in the image; d) determining an approximate position of each digit in the image, based on the global representation and the approximate position of each identified fingernail; e) refining the approximate position of each digit in the image, based on the respective digit-shape model and its corresponding function; and f) refining the position of each fingernail in the image, based on the respective fingernail sub-shape model and its corresponding function.

* * * * *